Feb. 12, 1924.

H. R. RICARDO 1,483,245

POWER TRANSMITTING MECHANISM

Filed June 30, 1922      3 Sheets-Sheet 1

Inventor
Harry R. Ricardo,
By Watson, Coit, Morse & Grindle,
Attys

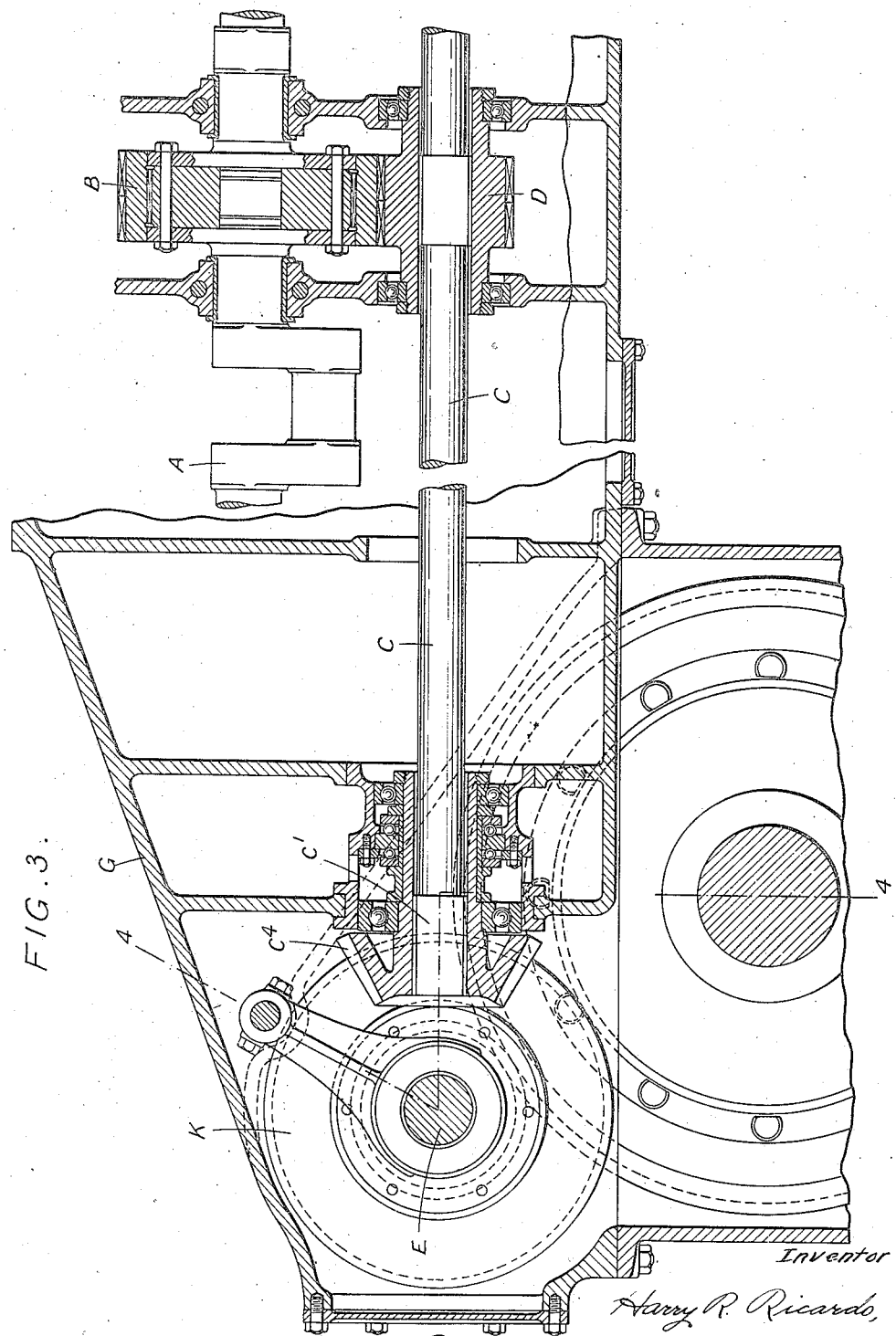

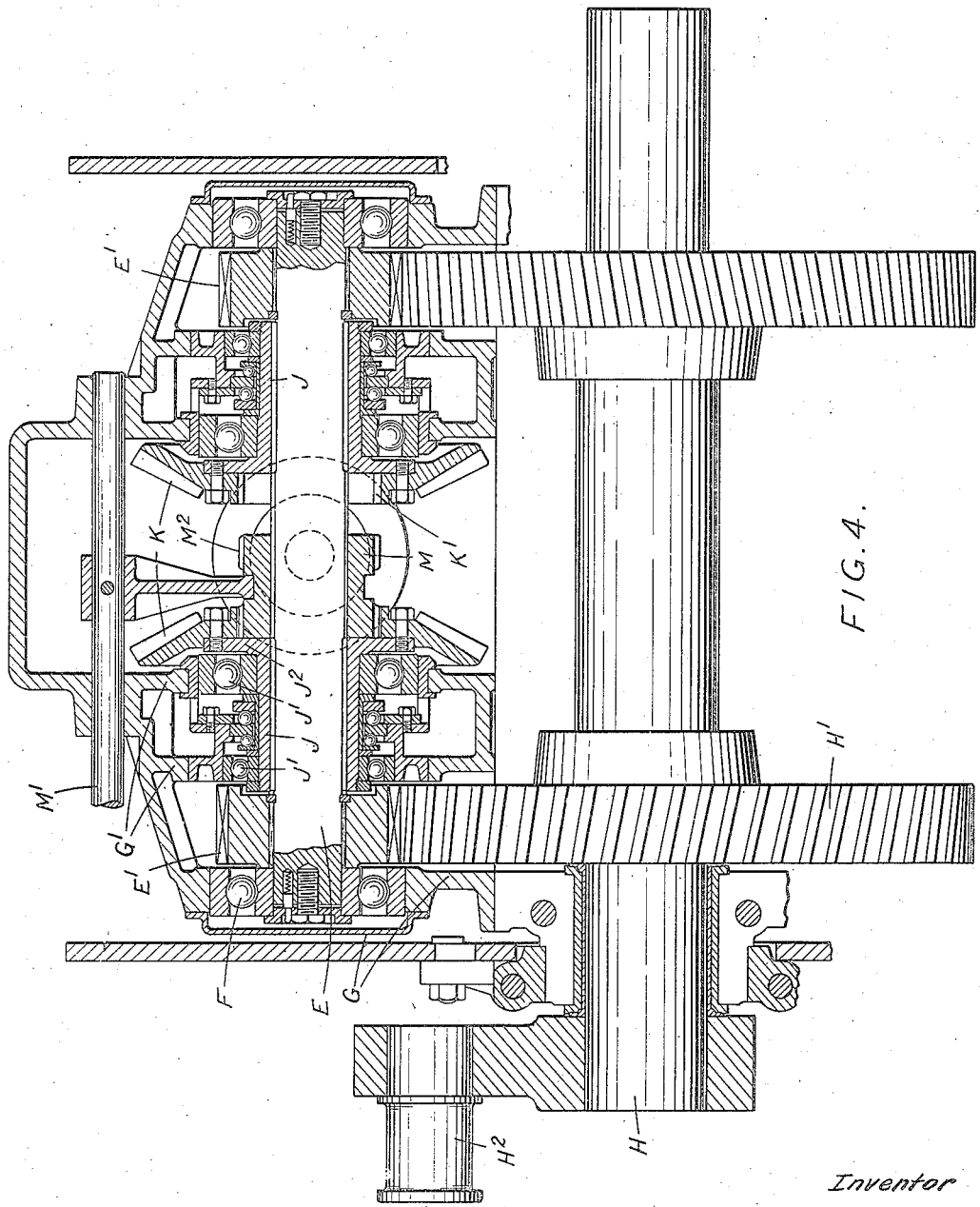

Patented Feb. 12, 1924.

1,483,245

UNITED STATES PATENT OFFICE.

HARRY RALPH RICARDO, OF LONDON, ENGLAND.

POWER-TRANSMITTING MECHANISM.

Application filed June 30, 1922. Serial No. 572,097.

*To all whom it may concern:*

Be it known that I, HARRY RALPH RICARDO, a subject of the King of England, and residing at London, in England, have invented certain new and useful Improvements in Power-Transmitting Mechanism, of which the following is a specification.

This invention relates to mechanism for transmitting power from reciprocating engines, more particularly internal combustion engines, and has for its object to provide a mechanism that can be used for various purposes as for instance the driving of the propellers of aircraft or the road or track wheels of a vehicle such as a locomotive.

Experience has shown the reliability of suitably designed mechanical gearing and in the present invention such gearing is employed in combination with a constructional arrangement which enables large horse power to be transmitted in an efficient manner whilst obviating torque irregularities to a considerable extent. In the applicant's prior Patent No. 1,306,125 it was proposed to provide a separate resilient or floating driving shaft for the propellers of aircraft, this shaft being so constructed and arranged that it is subject to torsion only while being protected from other stresses.

According to this invention two multicylinder engines are disposed side by side with their crank shafts parallel. On each shaft, at a point intermediate in its length, there is disposed a gear wheel, and both these gear wheels, which are similar, mesh with a single gear wheel mounted at one end of a resilient shaft arranged between and parallel to the crank shafts so that the drive is transmitted to this shaft. The resilient shaft is constructed and arranged so that it is subject to torsion only and is protected from other stresses.

Where the drive is to be transmitted to twin air propellers two coaxial or preferably concentric driven shafts are provided, one or each of which is resilient, and these shafts are disposed substantially between and parallel to the crank shafts. Alternatively a single propeller may be driven from the end of a single resilient shaft remote from that carrying the gear wheel meshing with the crank shaft pinions.

If desired power may be transmitted by means of a resilient shaft from the crank shaft of an internal combustion engine to the road or track wheels of a vehicle such as a locomotive. In that case, the transmission shaft is of such length and construction that it has appreciable resilience and the end of the transmission shaft remote from the engine carries a gear wheel by means of which power from the engine is transmitted through a transverse shaft and suitable gearing to the track-wheels of the vehicle. Preferably two bevel wheels are loosely mounted to rotate about but not on the transverse shaft, both these pinions meshing with a bevel pinion driven by the resilient shaft which lies between them. One or other of the bevel wheels can be locked to the transverse shaft whereby the drive is transmitted to the track wheels through the toothed gearing either in the forward or reverse direction. Preferably the two bevel pinions are mounted on sleeves carried in ball bearings by members which may be formed integral with or connected to the framework of the casing supporting the transverse shaft and the ends of the transverse shaft are also preferably carried in ball bearings.

As before, the resilient shaft can float and act somewhat in the manner of a spring so as to absorb torsional irregularities in the engine or engines.

In the accompanying drawings

Figure 3 is a sectional side elevation showing a suitable form of gearing for transmitting power from an internal combustion engine to the track wheels of a locomotive, and Figure 4 is a section on the line 4—4 of Figure 3.

Figure 1:
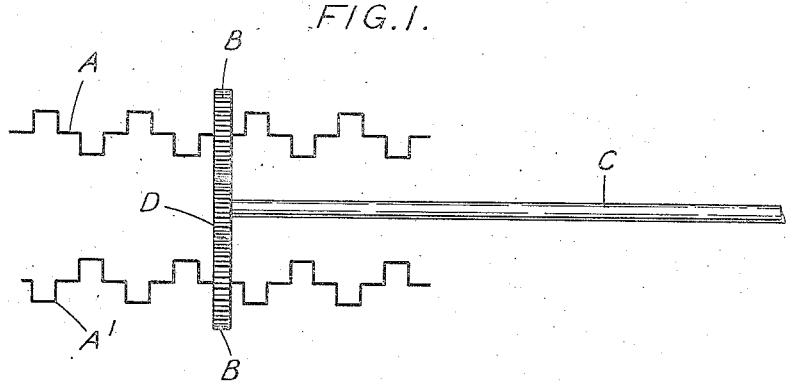
Figure 1 is a diagram showing a single driving shaft arranged between and driven from the crank shafts of two parallel multicylinder engines having their cylinders in line.
Figure 2:
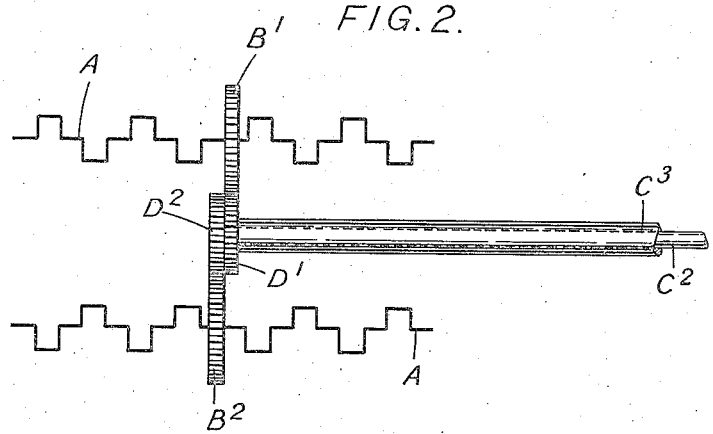
Figure 2 is a similar diagram of an arrangement where two concentric propeller shafts are employed.

In the diagrammatic arrangement illustrated in Figure 1 the crank shafts A of two multi-cylinder engines are disposed parallel and conveniently about midway in its length on each crank shaft there is mounted a similar gear wheel B so arranged that they lie in one plane transverse to the axes of the parallel crank shafts A. The transmission shaft C of such length and construction that it has appreciable resilience, is disposed between the engines and parallel to the crank shafts A and at one end of this transmission shaft adjacent to the engines is a gear wheel D which meshes with both the gear wheels B on the crank shafts A. At the other end of the transmission shaft C (not shown) is a pinion by means of which power can be transmitted to any suitable mechanism or an air propeller may be provided.

Where the drive is to be transmitted to twin propellers preferably two concentric shafts $C^2$ $C^3$ are provided one or each of which is resilient, these shafts being disposed between and parallel to the crank shafts A. The shaft $C^2$ carries a gear wheel $D^2$ and the shaft $C^3$ a gear wheel $D'$ respectively meshing with gear wheels $B^2$ $B'$ mounted on the crank shafts A. The inner shaft $C^2$ is preferably a resilient shaft as described above and the outer hollow shaft $C^3$ is conveniently constructed so as to have such measure of resiliency as may be constructionally possible. On the ends of these transmission shafts remote from the engine are separate propellers suitably carried in ball bearings the arrangement being such that the two propellers rotate in opposite directions in parallel adjacent planes.

The construction shown in Figures 3 and 4 illustrates an arrangement for transmitting power from an internal combustion engine to the track wheels of a locomotive. In this arrangement the crank shaft A of an internal combustion engine has mounted about the centre of its length a toothed wheel B meshing with a pinion D mounted on the end of a resilient shaft C. Preferably the engine has eight cylinders arranged in line and two similar engines are disposed side by side with their crank shafts parallel, each crank shaft A being provided with a gear wheel B meshing with the pinion D on the resilient shaft which lies between the engines and parallel to their crank shafts.

The construction and length of the shaft C is such that it will act substantially after the manner of a spring and absorb or damp out torsional irregularities so that these are not transmitted from the engine to the driving mechanism. The resilient shaft is in effect free to float and so arranged as to be subject to torsion only while being protected from other stresses.

Adjacent and opposite to the end of the resilient shaft C remote from the engine is a transverse shaft E disposed at right angles to the axis of the resilient shaft. The shaft E is carried at or towards its ends in ball bearings F by a casing G suitably disposed on the frame of the locomotive. At or near the ends of the transverse shaft E are fixed two pinions $E'$ each of which meshes with a toothed wheel H mounted on a lay shaft $H'$ provided at its ends with cranks $H^2$ the pins of which are coupled by rods (not shown) to crank pins on the track wheels of the locomotive. The track wheels are omitted from the drawings and if desired intermediate gearing may be provided between the pinions $E'$ and the toothed wheels H to effect a greater reduction in the gear drive.

The transverse shaft E passes through sleeves J carried in suitably arranged ball bearings $J'$ by brackets or other members $G'$ of the casing G. A clearance is left between the shaft E and the bore of the sleeves J so that each sleeve J is entirely free from the shaft. At the inner end of each sleeve, i. e., at the ends nearest the centre of the shaft E, there is formed an external flange $J^2$ to which is secured an annular member K provided with bevel teeth. Each sleeve J and its toothed annulus K thus constitutes a bevel wheel which is carried in ball bearings concentric with but free from the transverse shaft E. The two bevel wheels K face each other and between them and meshing with them both is a bevel pinion $C^4$ which is carried on a short shaft $C'$ suitably mounted in ball bearings and coupled by splines, jaws or other means to the adjacent end of the resilient shaft C.

On the central portion of the transverse shaft E which lies between the bevel wheels K and their sleeves J a dog clutch sleeve or like member M is mounted so that it will rotate with the shaft E but can slide thereon in an axial direction for instance when actuated by means of an operating rod $M'$. At each end of this sliding clutch member are formed teeth $M^2$ adapted to engage corresponding internal toothed rings $K'$ formed in or connected to the bevel wheels K or their sleeves.

The arrangement is such that both bevel wheels K are constantly rotated by the engine through the shaft C but only one of these pinions can be connected at one time to the transverse shaft E when the sliding clutch M is shifted along the transverse shaft to engage one or other of the bevel pinions. Thus the transverse shaft E can be driven in either direction while the direction of rotation of the resilient shaft C remains constant.

In this way simple mechanism is provided which enables the drive to be transmitted in either the forward or reverse direction and the mechanism may be standardized so that it can be employed equally to locomotives of different type having either relatively large or small track wheels it being only necessary to vary the dimensions of the gear wheels with which the pinions mesh on the ends of the transverse shaft.

It is to be understood that the constructional details may be varied considerably in accordance with this invention and that although the invention has been described primarily as applied only to air propellers or to track wheels of a locomotive, similar mechanism according to this invention may be applied to other uses.

What I claim as my invention and desire to secure by Letters Patent is:—

In mechanism of the class described, the combination with the crank shaft of a multi-cylinder reciprocating engine, of means for transmitting power without torque irregularities from this crank shaft to a member to be driven, said means including a transmission shaft arranged in substantial parallelism with the crank shaft and floatingly mounted so as to transmit torque only, gearing connecting this transmission shaft with the crank shaft at a point intermediate in the length of the cranked portion, said transmission shaft being of resilient material to damp out torsional vibrations.

In testimony whereof I have signed my name to this specification.

HARRY RALPH RICARDO.